Sept. 6, 1960 J. A. KOOISTRA 2,951,396
WORKER ROLL BEARING AND SHAFT CONSTUCTION IN A NAPPER
Filed March 12, 1959 2 Sheets-Sheet 1
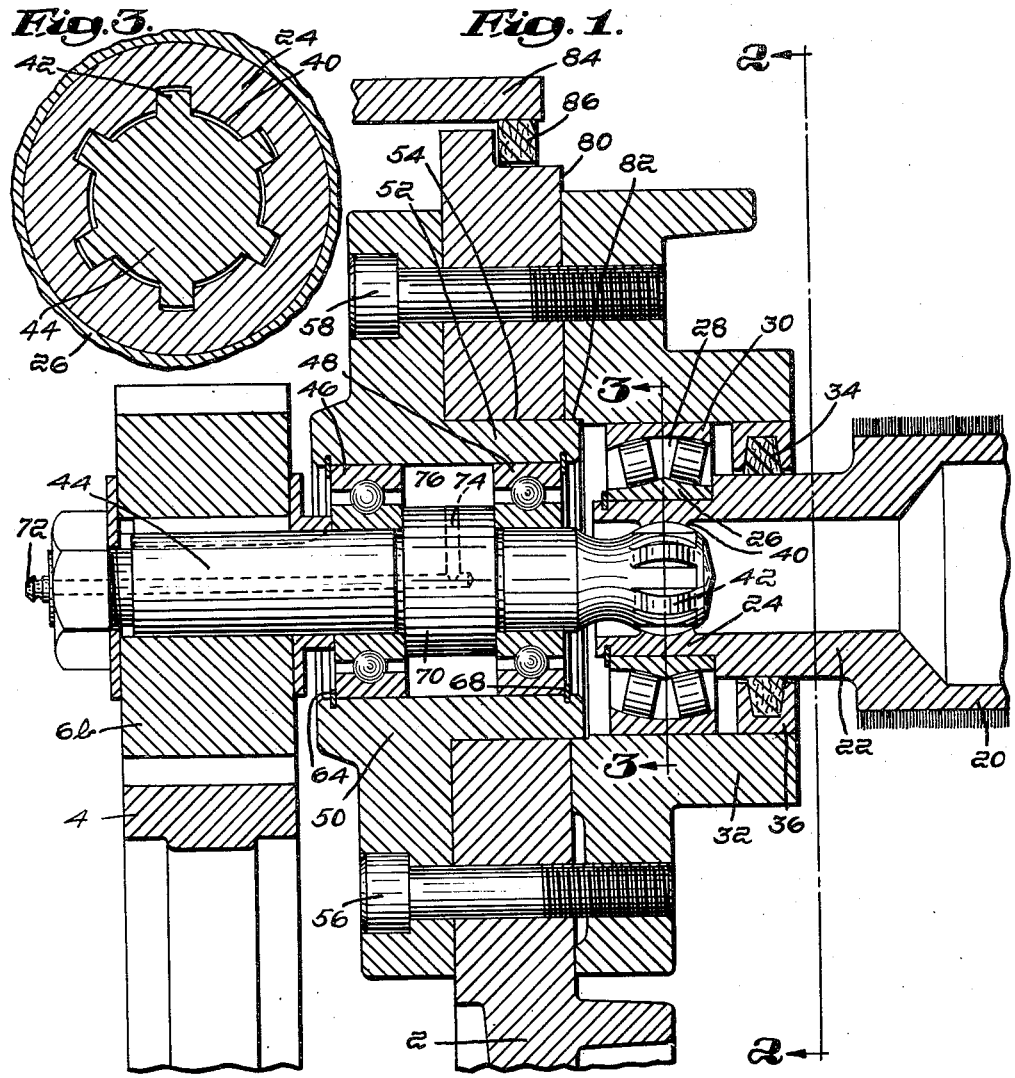
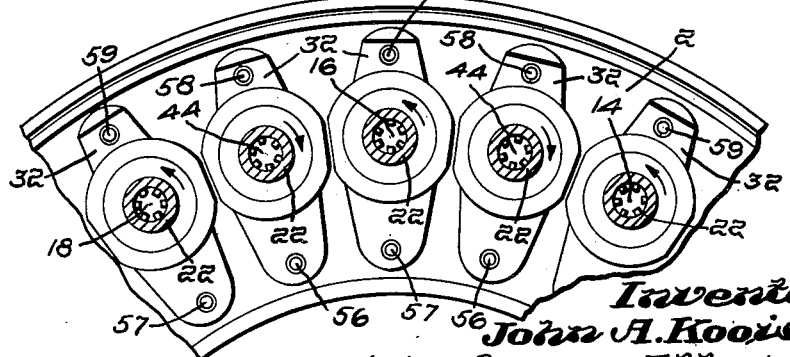
Inventor:
John A. Kooistra,
by Porter, Chittick, Russell Attorneys Inventor:
John A. Kooistra,
by Porter, Chittick & Russell.
Attorneys

United States Patent Office 2,951,396
Patented Sept. 6, 1960

2,951,396
WORKER ROLL BEARING AND SHAFT CONSTRUCTION IN A NAPPER

John A. Kooistra, North Andover, Mass., assignor to Davis & Furber Machine Company, North Andover, Mass., a corporation of Massachusetts Filed Mar. 12, 1959, Ser. No. 798,982

7 Claims. (Cl. 74—660)

This invention relates to the textile industry and is particularly concerned with the bearing and shaft construction used in a napper.

A napper is a well known machine used in the finishing of cloth and it does not need to be described in any detail herein. Suffice it to say that a napper includes a plurality of wire cloth covered worker rolls circumferentially arranged and supported at their ends on and near the outer peripheries of a pair of spaced cylinder heads. The cylinder heads revolve carrying the workers with them, and while the workers are being carried around by the cylinder heads they are also caused to revolve on their own axes. This revolution of the worker rolls is caused by gearing at both ends of the machine whereby adjacent workers are caused to revolve on their own axes in opposite directions even as they are moved in a cylindrical pattern under the influence of the rotating cylinder heads.

The workers are relatively long in relation to their diameters and with the cylinder heads having a diameter in the order of 3 feet and rotating at 125 r.p.m. the centrifugal force acting on the workers is considerable. Thus as the machine revolves, the workers bow outwardly appreciably under the forces involved. This outward bowing has a detrimental effect on the bearings supporting the ends of the rotating workers.

According to prior art constructions, the shaft at the end of each worker passes through the cylinder head wherein it is supported by a bearing and on the end of the shaft is a small gear which is in constant engagement with a large sun gear mounted concentrically with the axis of the cylinder head. As the workers bow outwardly, the small gear on the end of the worker roll shaft is forced inwardly toward the sun gear. This causes excessive gear on all parts involved. As a result the cooperating gears and the bearings supporting the worker shafts have to be replaced at more than normal intervals.

Accordingly it is an object of this invention to provide a worker roll shaft construction and bearings therefor which will substantially increase the life thereof and thus minimize shutdowns for repairs and replacements.

The aforestated objective is accomplished by making the end shafts of the workers in two parts. The first part of the shaft immediately adjacent the wire cloth is made to somewhat greater diameter than heretofore and is supported by a self-aligning bearing mounted on the cylinder head whereby the shaft will be free to shift its axial position within the bearing as the worker is bowed outwardly because of the high speed rotation of the cylinder heads.

The aforementioned first part or inner piece of the shaft is hollow and is connected by means of a specially designed spline to an outer piece of shafting. The outer piece is preferably solid and is mounted in a fixed bearing secured to the cylinder head and has on its outer end the small drive gear that cooperates with the large sun gear. Thus by making the shaft on the end of the worker in two pieces whereby the short inner piece may shift its axis slightly as the worker bows outwardly and connecting the inner piece with the outer piece by a spline that can accept lateral distortion, no bending loads are placed on the outer piece. In this way the outer piece of the shaft maintains its axis of rotation to hold the small drive gear in correct position with the sun gear. That is, the outward bending of the worker has no effect on the relationship of the gears and hence gear wear can be minimized.

A further advantage of the construction shown herein is that the entire bearing assembly may be removed at the end of the cylinder and the worker removed from the machine by being drawn endwise through the hole in the cylinder from which the bearings have been removed. Thus when a worker needs to be replaced it can be done very simply without disassembling the cylinder heads.

These and other objects of the invention will become more clearly understood as the description proceeds with the aid of the accompanying drawings in which Fig. 1 is a section taken radially through the outer portion of the cylinder head, the end of a worker roll, both bearings, the inner and outer pieces of the worker shaft and the worker drive gear and sun gear.

Fig. 2 is a fragmentary section of the inner side of the cylinder head taken on the line 2—2 of Fig. 1 showing the inner pieces of the shafts of five workers as they are supported circularly by corresponding bearings mounted on the cylinder head.

Fig. 3 is a section taken on the line 3—3 of Fig. 1 showing the splined engagement of the inner and outer pieces of the worker shaft.

Figure 4:
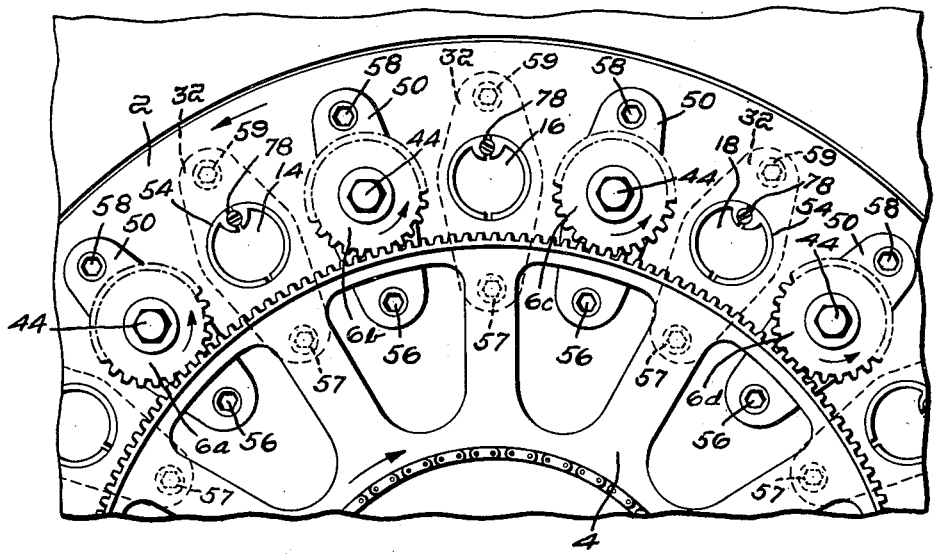
Fig. 4 is a fragmentary section looking toward one end of the napper and showing four of the small drive gears in engagement with the large sun gear.

Referring first to Figs. 2 and 4, there are shown fragmentary portions of a cylinder head of a napper and indicated at 2. There are two such cylinder heads mounted on a common shaft and spaced apart a distance of several feet to permit the mounting therebetween of a plurality of worker rolls (usually 24 or thereabouts), all of which are arranged circularly not far from the peripheries of the cylinder heads. In Fig. 2, the shafts and bearings of five such worker rolls are indicated, and in Fig. 4 nine such worker rolls are indicated.

Alternate worker rolls have drive gears on the shaft ends at one cylinder head and the other set of alternate rolls have gears on the shaft ends at the other cylinder head. Accordingly, in Fig. 4 it will be noticed that four small drive gears are shown which are the gears on the alternate set of rolls whose shafts extend through cylinder head 2. The other set of alternate rolls whose ends are covered by small closure plates have their gears at the other end thereof on the outside of the other cylinder head.

In Fig. 4 is shown in sun gear 4 which is arranged to rotate clockwise on the common shaft. The cylinder head 2 rotates counter-clockwise carrying with it all of the worker rolls. Thus the small gears 6a, 6b, 6c and 6d on the ends of the alternate worker roll shafts are caused to rotate counter-clockwise. At the other end of the machine is another sun gear arranged to rotate in the opposite direction from sun gear 4, and this causes the other set of alternate worker rolls, whose ends are behind the closure plates 14, 16 and 18, to rotate clockwise.

Figure 5:
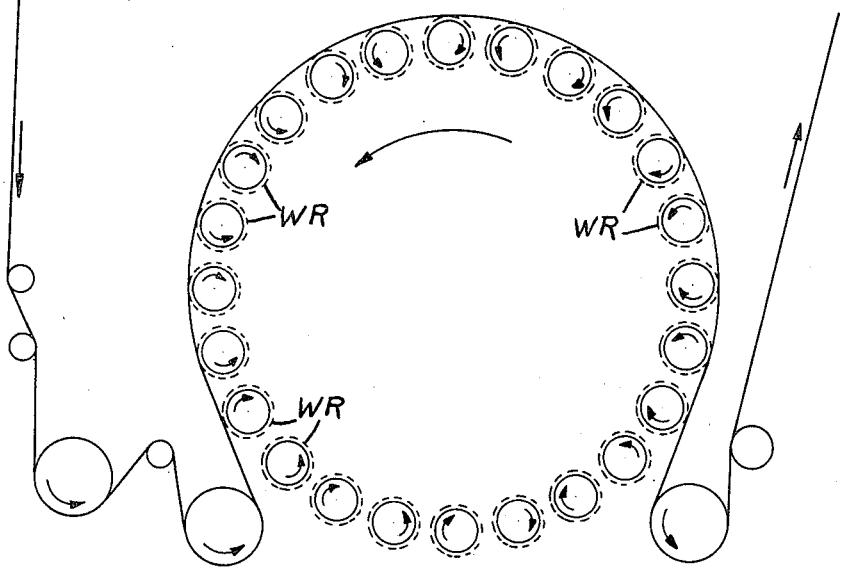
Fig. 5 is a schematic end view of a napper showing the course that a piece of cloth follows as it passes over the worker rolls of the napper, which is rotating in a direction contrary to the movement of the cloth.

Fig. 5 shows schematically the nature of the rotation of the individual worker rolls which have been designated WR as they are rotated bodily counter-clockwise by the rotation of the spaced cylinder heads between which they are supported.

Now referring to Fig. 1, which is an enlarged section taken on a line running radially through the cylinder head, there is shown the end of a worker roll 20 which terminates in an inner shaft 22. This shaft is short and hollow with thick walls and of considerable strength in relation to the worker roll. The terminal end of this inner shaft indicated at 24 is of reduced diameter and mounted within the inner race 26 of a self-aligning bearing 28. The outer race 30 resides within a circular opening in a bearing support 32. Bearing 28 is sealed against dust and dirt by a felt or rubber grease seal 34 which is maintained in position by a ring 36 having a suitable interior circular cavity therein. Ring 36 may be secured to support 32 by a set screw, not shown.

As shown in Fig. 3, the interior of shaft end 24 has a plurality of inwardly extending members 40 which cooperate with outwardly extending fingers 42 that are on the inner end of an outer shaft 44. In other words, there is splined engagement between inner shaft 22 and outer shaft 44. The fingers 42 are rounded on their exteriors in an axial direction and sufficient clearance is provided so that inner shaft 22 may have its axis swung slightly out of line with the axis of shaft 44 by pivoting at a point within the self-aligning bearing 28 without throwing any distorting load on the alignment of shaft 44.

Outer shaft 44 is supported by a pair of bearings 46 and 48 which may be of any suitable type. These bearings are carried in a bearing supporting member 50, which member has a sleeve-like portion 52 which fits within a corresponding circular opening 54 in the cylinder head 2. Suitable screws 56 and 58 extend through the ends of bearing support 50 and cylinder 2 and are screwed into the bearing support 32 to hold all parts firmly together on the cylinder head.

Washers 64 and 68 hold the bearings 46 and 48 in position within bearing support 50. Shoulder 70 on shaft 44 acts to hold the shaft against axial movement while at the same time maintaining bearings 46 and 48 in proper spaced relationship. On the outer end of shaft 44 is keyed a gear 6b which is in engagement with a sun gear 4.

From the construction just described, it will be seen that the spline elements 40 and 42 will at all times be in proper engagement with each other and that inner shaft 22 can deflect without outer shaft 44. Thus the gears 6b and 4 remain at all times with the correct clearance and wear is held to a minimum.

Bearings 46 and 48 may be lubricated from time to time by a lubricant which is supplied to passage 72 which feeds outwardly through passage 74 into the annular space 76 surrounding portion 70 and thence laterally into the bearings.

The opposite end of worker 20 shown in Fig. 1 has a short shaft thereon similar to shaft 22 which is supported in a self-aligning bearing the same as bearing 28 and carried by a support the same as support 32 in the cylinder head at the other end of the machine. There is, however, no outer shaft at the other end since there is no gear at the other end of the worker. That is to say, each worker has but one gear thereon. The gears are positioned on alternate workers at one end of the machine as indicated in Fig. 4 and on the other workers at the other end of the machine.

The openings 54 adjacent the bearing 28 of the rolls which have the gears at the other end of the machine are closed by closure elements 14, 16 and 18 shown in Fig. 4. Similar closures are present at the other end of rolls carrying gears 6a, 6b, 6c, 6d, etc. The closures are shallow cup-shaped devices which are placed in the openings and are secured therein by setting up on the screws 78 which act to wedge the sides outwardly to maintain themselves tightly in position. These closure elements ordinarily do not have to be removed, for if a worker roll is to be taken from the machine it will be removed at the gear end.

A further object of this invention is to provide a construction whereby the worker roll may be readily removed from the machine for repairs. Such removal is accomplished in the following manner: First the screws 56 and 58 are removed. As seen in Fig. 4, this can readily be done when the screws 56 are located between the spokes of sun gear 4. As soon as the screws are removed, the bearing support 50 may be rotated 90 degrees so that it is then outside the periphery of the sun gear. The bearing support 50 may then be moved in the direction of the axis of outer shaft 44 with the result that the entire outer shaft 44, the bearing support 50 and the bearings 46 and 48 along with drive gear 6b are removed as a unit. This is possible because the spline fingers 42 can be withdrawn from the coacting members 40 of the inner shaft 22.

Removal of worker rolls 20 is accomplished by moving bearing supports 32 inwardly on inner shaft 22 so that the bearing supports 32 have clearance between the cylinder heads 80, thus allowing the complete worker roll 20 with its bearing supports 32 to be lifted out of the machine.

In reassembling the elements, it will be noted that the inner end of sleeve 54 extends beyond the inner surface 80 of the cylinder head where it resides in a shallow cylindrical recess 82 in bearing support 32. This causes the bearing support 32 to be accurately centered with respect to outer shaft 44 so that the splines will be in correspondingly correct alignment.

The sun gear and associated elements that cause rotation of the napper are ordinarily encased within a housing and a portion of that housing is indicated at 84 in Fig. 1. This closely surrounds the periphery of the cylinder head 2 and, if desired, a sealing element 86 may be included to prevent the entry of fiber particles, dust and dirt to the gears and other driving elements.

It is my intention to cover all changes and modifications of the example of the invention herein chosen for purposes of the disclosure which do not constitute departures from the spirit and scope of the invention.

I claim:

1. Improved worker roll bearing and shaft construction in a napper which includes a pair of spaced cylinder heads and a sun gear, said improvement comprising a shaft extending from the end of the worker roll and formed in two axially aligned pieces, the outer shaft piece mounted in a bearing that is fixed to the cylinder head and having on its outer end a gear cooperating with the sun gear, the inner shaft piece being integral with said worker roll and carried by another bearing also fixed to the cylinder head and means coupling said outer and inner shaft pieces whereby rotation of the outer piece will cause corresponding rotation of the inner piece, said means permitting deflection of the axis of the inner piece without causing deflection of the axis of the outer piece.

2. The construction set forth in claim 1, said inner shaft piece bearing being of the self-aligning type.

3. The construction set forth in claim 1, one of said shaft pieces being hollow and said coupling means comprising cooperating splines on said shaft pieces.

4. The construction set forth in claim 1, said coupling means comprising cooperating splines on the adjacent ends of said shaft pieces, the splines being so formed as to permit deflection of the inner shaft piece as the worker roll is bowed outwardly during operation without affecting the alignment of the outer piece.

5. The construction set forth in claim 1, said inner shaft piece bearing carried by a support on the inner side of said cylinder head and the outer shaft piece bearing carried by a support on the outer side of said head.

6. The construction set forth in claim 5, in which the support of the outer bearing coacts with the support of the inner bearing to maintain shaft bearings in normal axial alignment.

7. Means for rotationally supporting a two-piece worker roll shaft on the cylinder head of a napper, said means comprising an opening through said cylinder head, said opening being larger than the cross-sectional area of said worker roll, a first bearing support secured to one face of said cylinder head, a projection extending from said support and fitting into said opening and extending beyond the other face of said cylinder head, a second bearing support secured to the other face of said cylinder head and having part thereof in cooperating engagement with that part of said projection that extends beyond said other face to maintain said two supports in aligned relation, first and second axially aligned openings in said two supports, first and second axially aligned bearings positioned respectively in said first and second axially aligned openings, one of the pieces of said worker roll shaft mounted in said first bearing, the other of said pieces of said worker roll shaft mounted in said second bearing, said two pieces of the worker roll shaft being spline connected, the opening through said second bearing support being larger than the cross-sectional area of said worker roll, whereby upon the removal of said first bearing support and the first bearing and piece of shaft carried therein, said second bearing and shaft carried therein and the associated worker roll may be removed from said napper by being moved axially through the said opening in said second bearing support.

References Cited in the file of this patent

UNITED STATES PATENTS

| | | |
|---|---|---|
| 1,841,418 | Scott | Jan. 19, 1932 |
| 1,864,635 | Beutner et al. | June 28, 1932 |
| 2,676,387 | McArn | Apr. 27, 1954 |
| 2,803,151 | Clerk | Aug. 20, 1957 |

FOREIGN PATENTS

| | | |
|---|---|---|
| 310,682 | Switzerland | Jan. 4, 1956 |
| 741,971 | Great Britain | Dec. 14, 1955 |